US009520745B2

(12) United States Patent
Yang

(10) Patent No.: US 9,520,745 B2
(45) Date of Patent: Dec. 13, 2016

(54) LOW STANDBY CONSUMPTION POWER SUPPLY SYSTEM HAVING MULTI-CHANNELS FOR POWER SUPPLY

(71) Applicant: SK hynix Inc., Icheon-si Gyeonggi-do (KR)

(72) Inventor: Chia Jung Yang, Zhubei (TW)

(73) Assignee: SK hynix Inc., Icheon-si (KR)

( * ) Notice: Subject to any disclaimer, the term of this patent is extended or adjusted under 35 U.S.C. 154(b) by 478 days.

(21) Appl. No.: 14/086,556

(22) Filed: Nov. 21, 2013

(65) Prior Publication Data
US 2014/0139020 A1 May 22, 2014

(30) Foreign Application Priority Data

Nov. 21, 2012 (TW) .............................. 101143361 A

(51) Int. Cl.
*H02J 1/12* (2006.01)
*H02J 3/00* (2006.01)
*H02J 9/00* (2006.01)

(52) U.S. Cl.
CPC ............ *H02J 9/005* (2013.01); *Y10T 307/359* (2015.04)

(58) Field of Classification Search
CPC .............. H02J 3/383; H02J 3/386; H02J 4/00; H02J 3/32; H02J 3/382; H02J 7/35; H02J 1/102; H02J 9/062; H02J 1/10; H02J 3/14; H02J 7/0068; H02J 9/061; H02J 1/08; H02J 2001/004; H02J 3/28
USPC .......................................................... 307/25
See application file for complete search history.

(56) References Cited

U.S. PATENT DOCUMENTS

| 8,957,543 | B2* | 2/2015 | Adelson | ............... | H02J 7/0013 |
| | | | | | 307/19 |
| 2007/0029882 | A1* | 2/2007 | Watanabe | .............. | G11B 33/06 |
| | | | | | 307/112 |
| 2009/0251010 | A1* | 10/2009 | Hsu | ........................ | H02J 9/061 |
| | | | | | 307/126 |

(Continued)

FOREIGN PATENT DOCUMENTS

CN 201945944 U 8/2011
TW M368127 U1 11/2009

(Continued)

*Primary Examiner* — Jared Fureman
*Assistant Examiner* — Esayas Yeshaw
(74) *Attorney, Agent, or Firm* — William Park & Associates Ltd.

(57) ABSTRACT

A low standby consumption power supply system having multi-channels for power supply is used to power first and second circuit blocks. The main supply module provides power to the first circuit-block, while the second supply module provides power to the second circuit-block. The enabling line is used to transmit an enabling signal to the main supply module to switch the main supply module from a power-off status to a power-on status. The enabling line operates under enabling mode and power-off mode. Under enabling mode, the enabling line transmit the enabling signal to the main supply module, such that the main supply module and the low-current supply module respectively provide power to the first circuit-block and the second circuit-block simultaneously. Under the power-off mode, the enabling signal is cut off and the main supply module stop providing power, so as to cut off standby current of the main supply module.

8 Claims, 9 Drawing Sheets

(56) References Cited

U.S. PATENT DOCUMENTS

| | | | | |
|---|---|---|---|---|
| 2010/0149716 A1* | 6/2010 | Bakken | ............... | E02F 9/26 |
| | | | | 361/143 |
| 2011/0260538 A1* | 10/2011 | Huang | ............... | H02J 9/062 |
| | | | | 307/64 |
| 2012/0117394 A1* | 5/2012 | Lu | ............... | G06F 1/266 |
| | | | | 713/310 |

FOREIGN PATENT DOCUMENTS

| TW | 201207607 A1 | 2/2012 |
|---|---|---|
| TW | 201227261 A1 | 7/2012 |
| TW | 201234167 A1 | 8/2012 |

\* cited by examiner

LOW STANDBY CONSUMPTION POWER SUPPLY SYSTEM HAVING MULTI-CHANNELS FOR POWER SUPPLY

FIELD OF THE INVENTION

The present invention relates to power supply devices, and more particularly, to a low standby consumption power supply system having multi-channels for power supply.

BACKGROUND OF THE INVENTION

Referring to FIG. 1, a power supply system 2 is adapted to supplying power to an electronic circuit assembly 1 of an electronic device. The electronic circuit assembly 1 includes a functional circuit system 3 and the power supply system 2. The technical features of the functional circuit system 3 shown as a simple block in FIG. 1 depend on the type of the electronic device.

The power supply system 2 is usually a DC-to-DC transformer, such as a low-dropout (LDO), adapted to convert a relatively high voltage of 3.3V into 1.2V to be supplied to the functional circuit system 3.

The power supply system 2 has to supply the power required by the functional circuit system 3 in its entirety. In the situation where the operating maximum load current of the power supply system 2 is relatively high, the standby current of the power supply system 2 is also relatively high.

In the situation where the electronic circuit assembly 1 switches from an operation mode to a sleep mode or an idle mode, although the functional circuit system 3 is partially shut down, the power supply system 2 still has to stay in a standby state in order to wake up electronic circuit assembly 1 at any time. As mentioned above, the power supply system 2 with a high maximum load also has a high standby current; as a result, the electronic circuit assembly 1 in the sleep mode or idle mode still manifests overly high standby current consumption. The amplitude of the standby current of a conventional power supply system is not adjustable; as a result, the standby power consumption of a conventional power supply system cannot be reduced.

SUMMARY OF THE INVENTION

In view of this, an embodiment of the present invention provides a low standby consumption power supply system having multi-channels for power supply to reduce the standby power consumption of the power supply system.

In order to achieve the above and other objectives, an embodiment of the present invention provides a low standby consumption power supply system having multi-channels for power supply. The power supply system supplies power to an electronic circuit assembly. The electronic circuit assembly comprises a first circuit block and a second circuit block. The circuit blocks have their respective functions, so as to build the electronic circuit assembly with robust and complete functions.

The power supply system comprises at least a main power supply unit, a low current supply unit, and an enable signal line. The main power supply unit supplies power to the first circuit block. The low-current power supply unit supplies power to the second circuit block. The enable signal line sends an enable signal to the main power supply unit, so as to switch the main power supply unit from a power-off status to a power-on status.

The enable signal line operates in an enable mode and a shutdown mode. In an enable mode, the enable signal line sends an enable signal to the main power supply unit, such that the main power supply unit and the low-current power supply unit simultaneously supply power to the first circuit block and the second circuit block, respectively. In a shutdown mode, the enable signal interrupts, such that the main power supply unit shuts down and stops supplying output power to the first circuit block, so as to interrupt its standby current consumption.

The present invention according to various embodiments is characterized in that, inter alia: the electronic circuit assembly is divided into a plurality of circuit blocks; and the power supply system is divided into a plurality of power supply units. In the electronic circuit assembly standby state, it is only necessary for a portion of the power supply system to stay standby and only necessary to supply a tiny current to a portion of the circuit blocks of the electronic circuit assembly. It is not necessary for the whole of the power supply system to stay standby; instead, the power supply system is partly power-off and partly standby, so as to reduce standby current and reduce standby power consumption.

BRIEF DESCRIPTION OF THE DRAWINGS

Preferred embodiments and advantages of the present invention are hereunder described in conjunction with the accompanying drawings, in which.

DETAILED DESCRIPTION OF THE PREFERRED EMBODIMENTS

Figure 2:
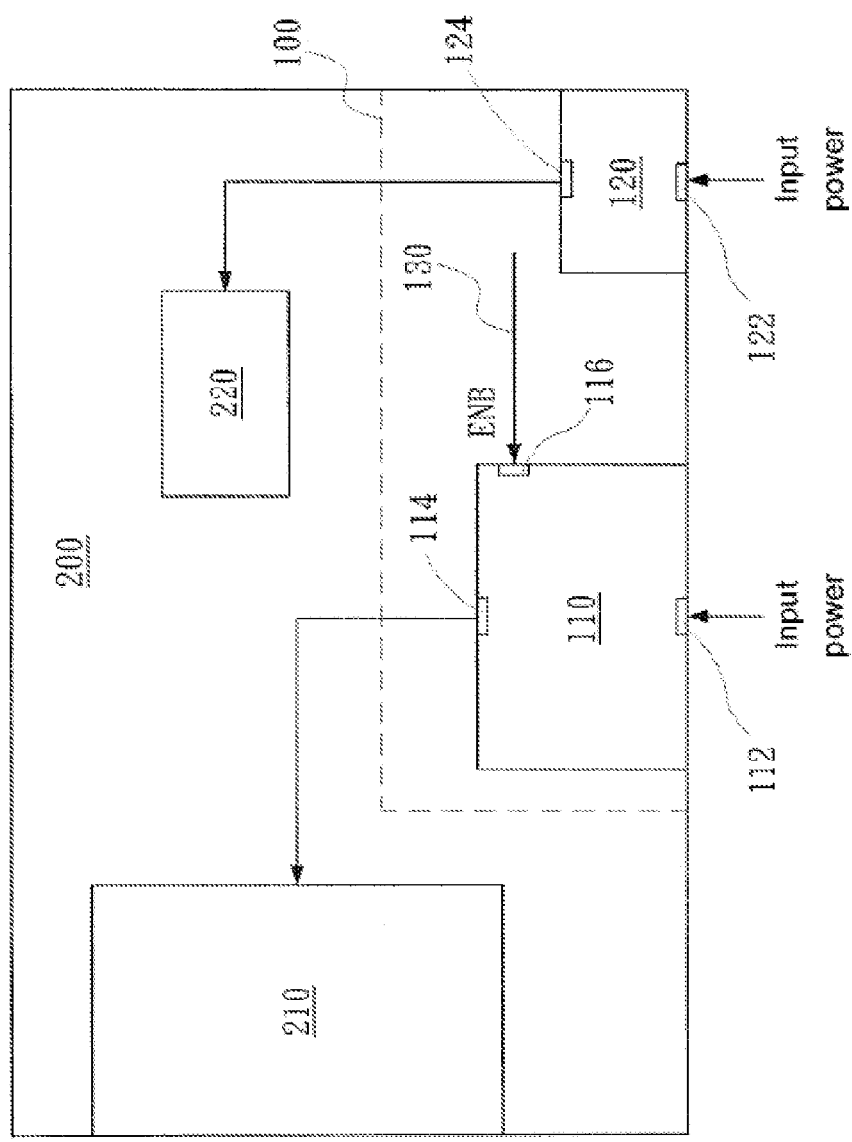
FIG. 2 is a circuit block diagram of a low standby consumption power supply system having multi-channels for power supply according to an embodiment of the present invention, wherein an enable signal line operates in a shutdown mode.

Referring to FIG. 2, there is shown a circuit block diagram of a low standby consumption power supply system 100 having multi-channels for power supply according to the first embodiment of the present invention. The power supply system 100 is adapted to supplying power to an electronic circuit assembly 200. The electronic circuit assembly 200 comprises a first circuit block 210 and a second circuit block 220. The first circuit block 210 and the second circuit block 220 have their respective functions so as to form the electronic circuit assembly 200 completely. The first circuit block 210 and the second circuit block 220 have their respective maximum consumption currents, and the sum of the two maximum consumption currents equals the maximum consumption current of the electronic circuit assembly 200. The technical features of the first circuit block 210 and the second circuit block 220 depend on the type of the electronic circuit assembly 200; therefore, the first circuit block 210 and the second circuit block 220 are illustrated with the simple block diagram of FIG. 2, but the present invention is not restrictive of the type of the first circuit block 210 and the second circuit block 220.

Referring to FIG. 2, the power supply system 100 comprises a main power supply unit 110, a low-current power supply unit 120, and an enable signal line 130. The main power supply unit 110 and the low-current power supply unit 120 are adapted to receiving an input power and convert the input power into an output power, respectively. The main power supply unit 110 is connected to the first circuit block 210. The low-current power supply unit 120 is connected to the second circuit block 220.

The main power supply unit 110 and the low-current power supply unit 120 are each usually a DC-to-DC transformer, such as a low-dropout (LDO). In the first embodiment, the main power supply unit 110 and the low-current power supply unit 120 are adapted to receiving an input power of a voltage of 3.3V and convert the 3.3V input power into an output power of 1.2V, respectively. The maximum consumption current of the first circuit block 210 is relatively large; therefore, the main power supply unit 110 of relatively large maximum load current supplies the output power to the first circuit block 210. As the maximum consumption power of the second circuit block 220 is relatively small, it is desirable for the low-current power supply unit 120 with a relatively small maximum load current to supply output power to the second circuit block 220.

Referring to FIG. 2, the main power supply unit 110 comprises a main power input end 112, a main power output end 114, and a switch pin 116. The main power input end 112 receives 3.3V input power. The main power output end 114 outputs 1.2V output power. The switch pin 116 receives an enable signal ENB and thereby switches the main power supply unit 110 to a power-on status.

The low-current power supply unit 120 comprises an auxiliary power input end 122 and an auxiliary power output end 124. The auxiliary power input end 122 receives 3.3V input power. The auxiliary power output end 124 outputs 1.2V output power. The auxiliary power input end 122 and the main power input end 112 of the main power supply unit 110 are connected to the same power source and therefore receive input power from the same power source.

The enable signal line 130 is connected to the switch pin 116 of the main power supply unit 110 to thereby send enable signal ENB to the main power supply unit 110, so as to switch the main power supply unit 110 from a power-off status to a power-on status.

Figure 3:
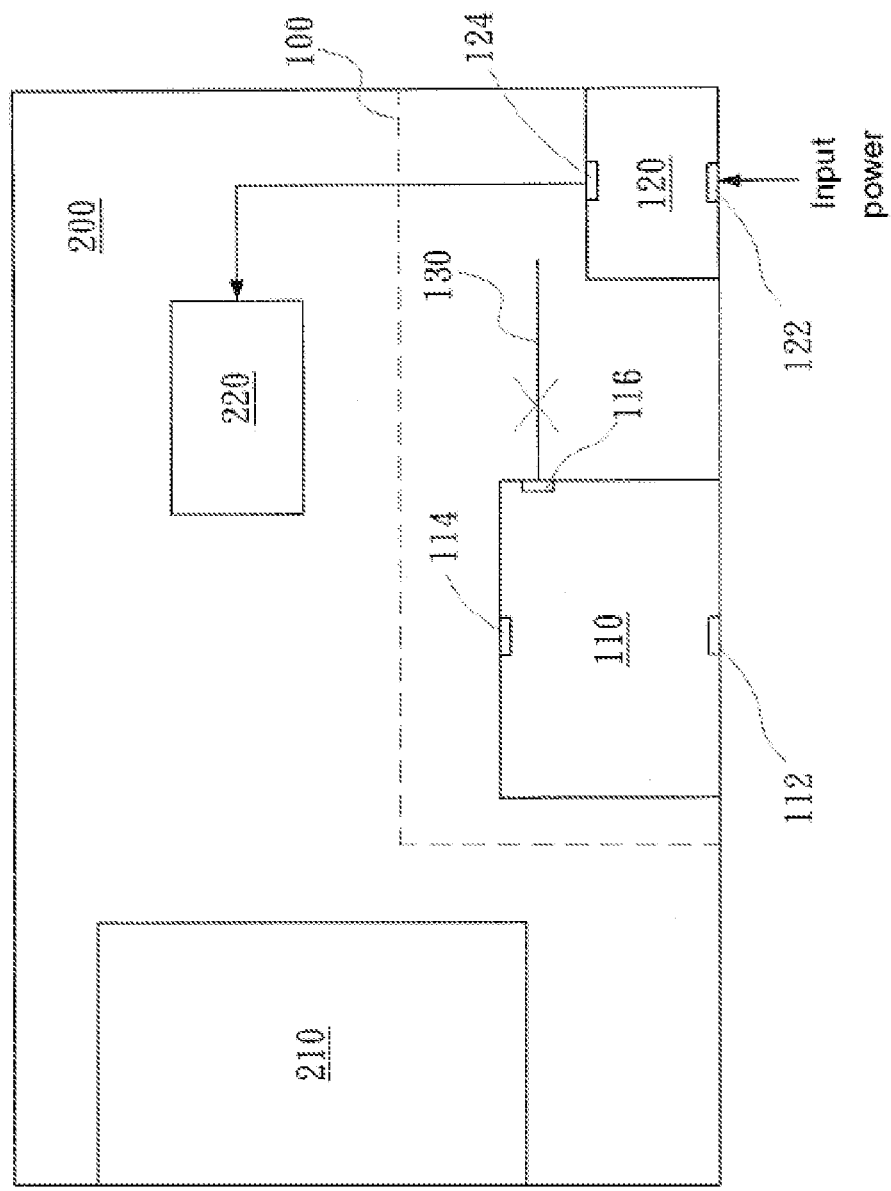
FIG. 3 is a circuit block diagram of the power supply system according to an embodiment of the present invention, wherein the enable signal line operates in an enable mode

Referring to FIG. 2 and FIG. 3, the enable signal line 130 operates in an enable mode and a shutdown mode.

Referring to FIG. 2, in the enable mode, the enable signal line 130 sends enable signal ENB to the main power supply unit 110. The main power supply unit 110 receives enable signal ENB via the switch pin 116 and therefore switches from a power-off status to a power-on status. At this point in time, the main power supply unit 110 continuously receives input power and supplies output power to the first circuit block 210. At this point in time, the main power supply unit 110 and the low-current power supply unit 120 supply power to the first circuit block 210 and the second circuit block 220 simultaneously. Even though at this point in time the first circuit block 210 is nearly in a power-off status and therefore does not consume any power, the main power supply unit 110 still consumes a standby current. Similarly, even though at this point in time the second circuit block 220 is nearly in a power-off status and therefore does not consume any power, the low-current power supply unit 120 still consumes a standby current.

Referring to FIG. 3, in the shutdown mode which takes place, for example, when the electronic circuit assembly 200 enters the sleep mode or the standby mode, the first circuit block 210 is power-off and therefore does not need any consumption power, whereas the second circuit block 220 only needs to maintain standby power consumption in order to keep receiving a trigger signal at any time, so as to turn on the first circuit block 210 for waking up the electronic circuit assembly 200. At this point in time, the enable signal line 130 stops outputting, such that enable signal ENB interrupts to thereby shut down the main power supply unit 110 fully, thereby interrupting its standby current consumption. The low-current power supply unit 120 only has to supply a tiny current to the second circuit block 220 to cause the second circuit block 220 to stay in the standby state. Take a computer motherboard as an example, the second circuit block 220 usually comes in the form of a combination of a BIOS and an embedded controller and is adapted to receiving and discerning a waking signal so as to wake up the first circuit block 210.

Referring to FIG. 3, in the shutdown mode, with the main power supply unit 210 being shut down, the power supply system 100 is partly power-off and partly standby. Unlike its conventional counterpart (shown in FIG. 1), the standby current consumed by the partly power-off power supply system 100 is less than the standby current consumed by the fully standby power supply system 100, thereby achieving low standby power consumption. If the second circuit block 220 is selected to be the least power-consuming block in the electronic circuit assembly 200, the second circuit block 220 and the low-current power supply unit 120 with a relatively low standby current together will minimize the standby current of the power supply system 100 operating in a low standby consumption operation mode.

Figure 1:
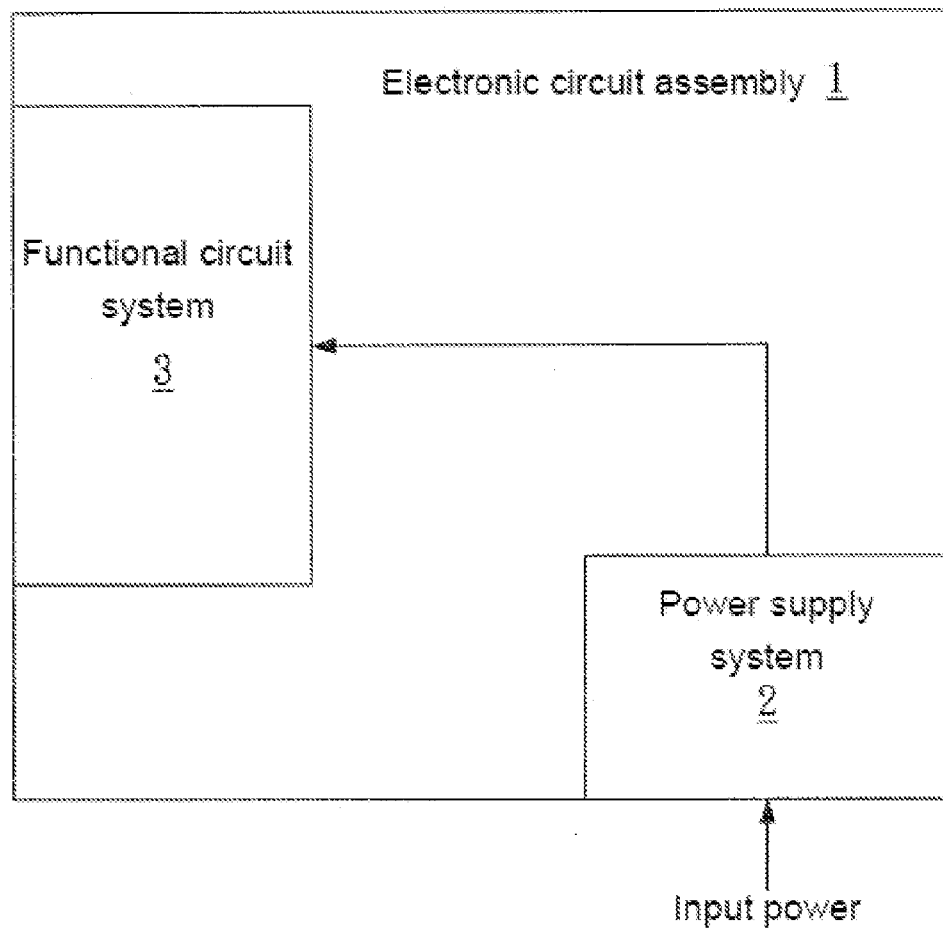
FIG. 1 (prior art) is a circuit block diagram of a conventional power supply system.

For example, according to the prior art illustrated with FIG. 1, a transformer with a maximum load of 300 mA and a standby current of 50 uA is conducive to the operation of the electronic circuit assembly 200 in its entirety. In the first embodiment of the present invention, the main power supply unit 110 has a maximum load of 300 mA and a standby current of 50 uA, whereas the low-current power supply unit 120 has a maximum load of 50 mA and a standby current of 10 uA.

In the normal operation mode of the electronic circuit assembly 200, the actual load of the power supply system 100 depends on the electronic circuit assembly 200 but does not increase with the overall maximum load of the power supply system 100.

In the low standby consumption operation mode of the electronic circuit assembly 200, the prior art illustrated with FIG. 1 requires consuming a 50 uA standby current. By contrast, as regards the power supply system 100 of the present invention, only the low-current power supply unit 120 consumes a 10 uA standby current, whereas the main power supply unit 110 does not consume any standby current. Therefore, the power supply system 100 of the present invention achieves low standby power consumption.

Figure 4:
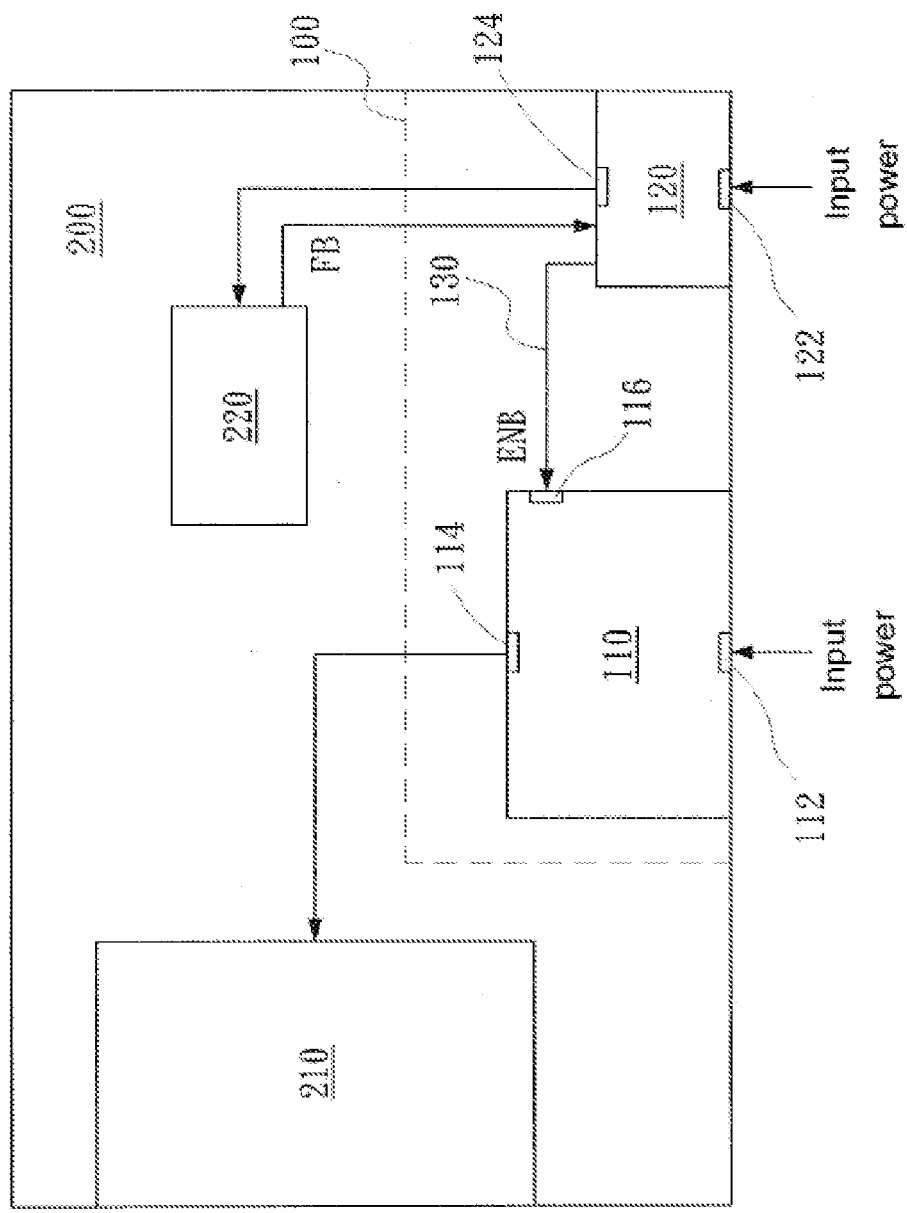
FIG. 4 is another circuit block diagram of the power supply system according to an embodiment of the present invention.

Referring to FIG. 4, after the second circuit block 220 has generated and sent feedback signal FB to the low-current power supply unit 120, the low-current power supply unit 120 generates and sends enable signal ENB to the switch pin 116 of the main power supply unit 110. Therefore, the enable signal line 130 is electrically connected to the low-current power supply unit 120 and the switch pin 116 of the main power supply unit 110.

Figure 5:
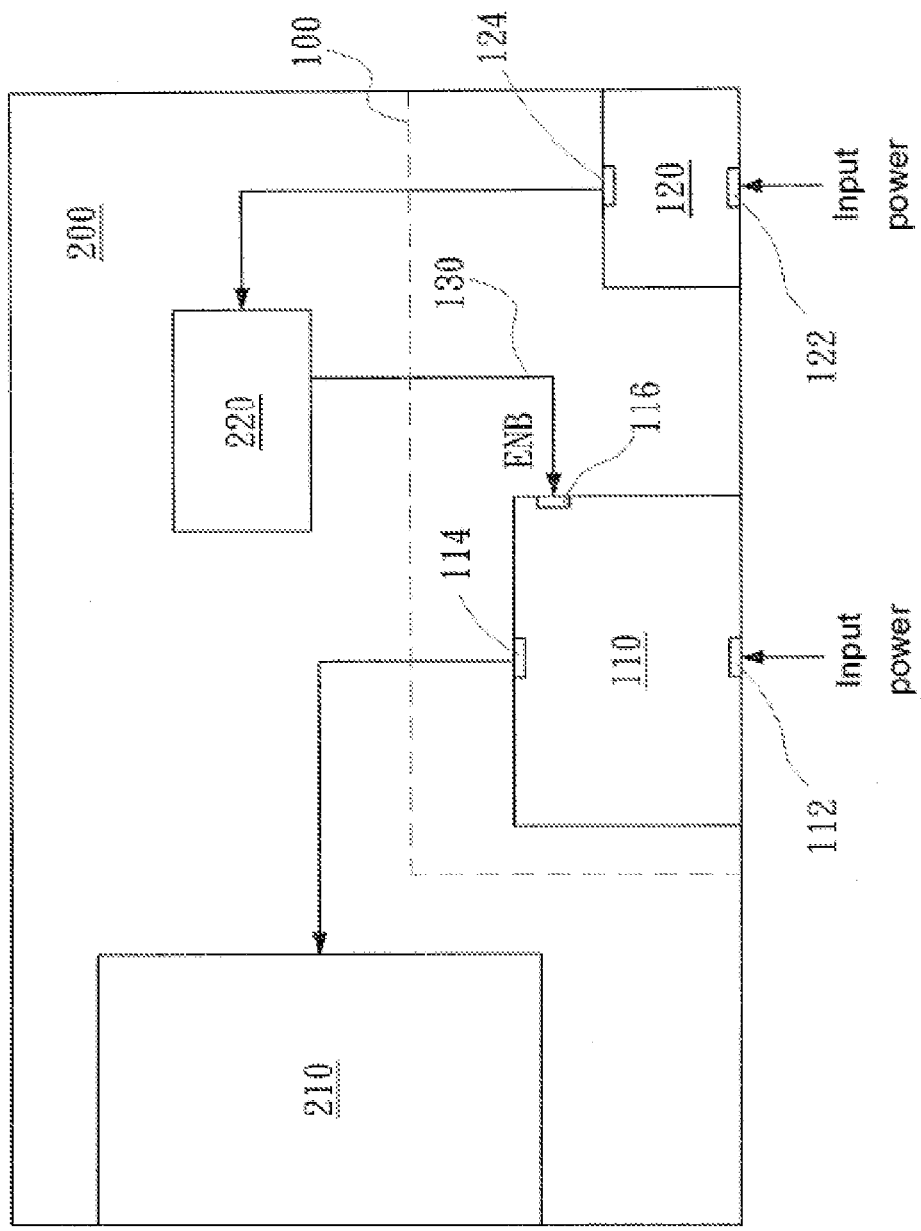
FIG. 5 is yet another circuit block diagram of the power supply system according to an embodiment of the present invention.

Referring to FIG. 5, with the low-current power supply unit 120 supplying current regularly to maintain operation of the second circuit block 220, enable signal ENB can also be generated by the second circuit block 220 and sent to the switch pin 116 of the main power supply unit 110. That is to say, the enable signal line 130 is electrically connected to the second circuit block 220 and the switch pin 116 of the main power supply unit 110.

Figure 6:
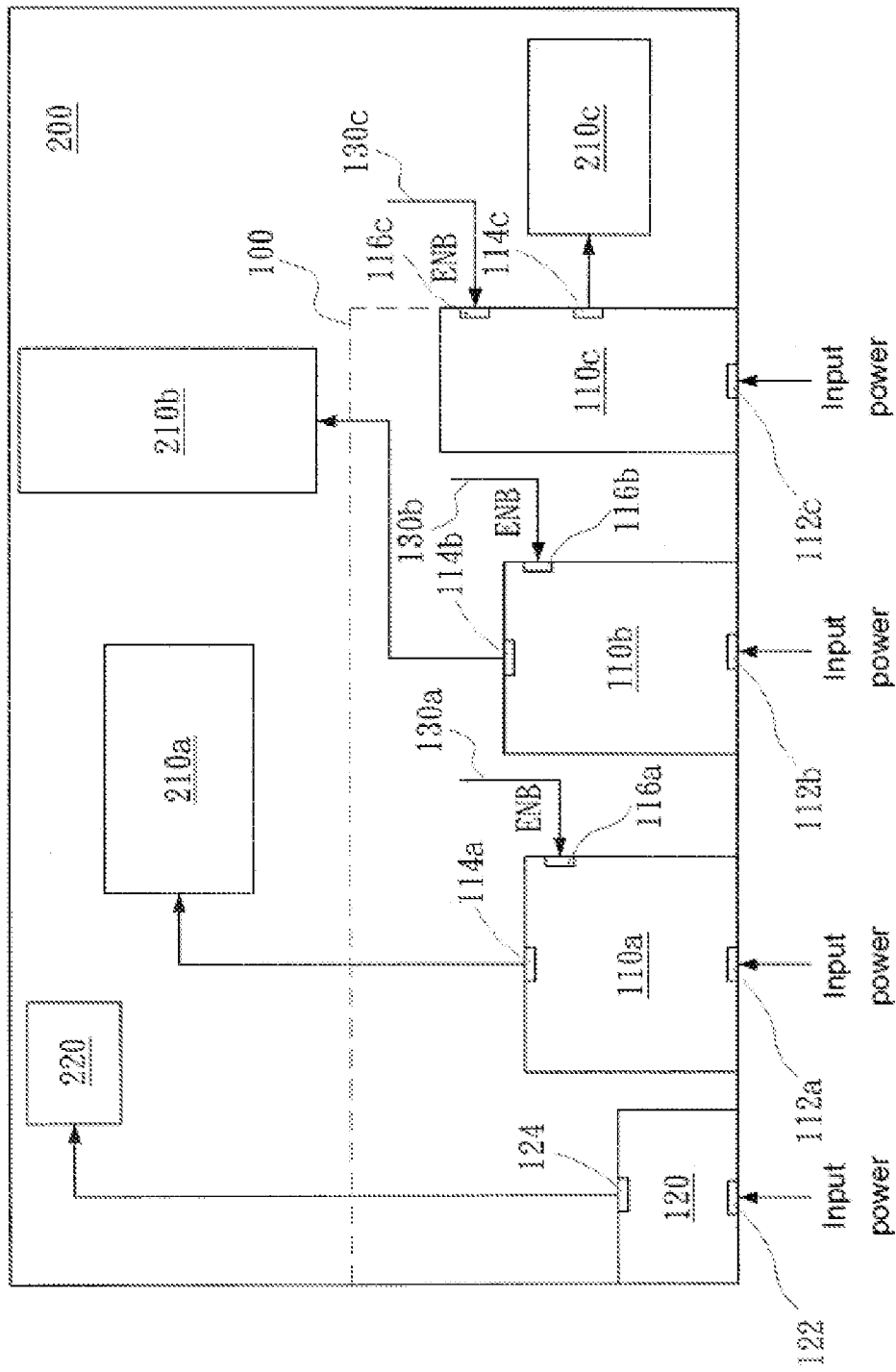
FIG. 6 is a circuit block diagram of the power supply system according to another embodiment of the present invention.

Referring to FIG. 6, in the second embodiment of the present invention, the power supply system 100 supplies power to the electronic circuit assembly 200. The electronic circuit assembly 200 comprises a plurality of first circuit blocks 210a, 210b, 210c and the second circuit block 220. The first circuit blocks 210a, 210b, 210c have their respective functions. The current load arising from the second circuit block 220 is usually less than any one of the first circuit blocks 210a, 210b, 210c.

Referring to FIG. 6, the power supply system 100 comprises a plurality of main power supply units 110a, 110b, 110c, the low-current power supply unit 120, and a plurality of enable signal lines 130a, 130b, 130c.

The main power supply units 110a, 110b, 110c and the low-current power supply unit 120 are rectifiers or any voltage or current converters, such as the low-dropouts (LDO) in the first embodiment. The main power supply units 110a, 110b, 110c and the low-current power supply unit 120 differ in terms of the maximum loads they provide and their standby currents. The standby current of the low-current power supply unit 120 is usually lower than that of any one of the first circuit blocks 210a, 210b, 210c.

Referring to FIG. 6, the main power supply units 110a, 110b, 110c comprise main power input ends 112a, 112b, 112c, main power output ends 114a, 114b, 114c, and switch pins 116a, 116b, 116c, respectively. The low-current power supply unit 120 comprises an auxiliary power input end 122 and an auxiliary power output end 124.

Referring to FIG. 6, the switch pins 116a, 116b, 116c are each connected to an enable signal line 130, and the enable signal lines 130 each operate in an enable mode and a shutdown mode. In the enable mode, the enable signal lines 130 each send enable signal ENB to a corresponding one of the switch pins 116a, 116b, 116c to allow the corresponding one of the main power supply units 110a, 110b, 110c to perform routine tasks, such that the main power supply unit 110 and the low-current power supply unit 120 supply power to the first circuit block 210 and the second circuit block 220 simultaneously.

In the shutdown mode, the enable signal ENB interrupts, such that the main power supply unit 110 shuts down and stops supplying the output power to the first circuit block 210 to thereby interrupt standby current consumption thereof. Therefore, in the power supply system 100, the standby current of at least one said main power supply unit 110 is interruptible, thereby reducing standby current consumption.

In the second embodiment, it is feasible to switch between the modes of the enable signal lines 130 separately but unnecessary to enable or shut down all the main power supply units 110 simultaneously.

For instance, when the electronic circuit assembly 200 is operating in the sleep mode, the enable signal lines 130 are concurrently set to the shutdown mode, such that in the power supply system 100 only the low-current power supply unit 120 stays in the standby state and consumes a standby current.

When the electronic circuit assembly 200 is in the idle mode, a portion of the first circuit blocks 210a, 210b, 210c shuts down, whereas the other portion of the first circuit blocks 210a, 210b, 210c is enabled. At this point in time, only a portion of the enable signal lines 130a, 130b, 130c is switched to the shutdown mode, whereas the other portion of the enable signal lines 130a, 130b, 130c is switched to the enable mode.

The first circuit blocks 210 which have shut down and the main power supply units 110 corresponding thereto stop standby current consumption. As soon as the electronic circuit assembly 200 switches to the normal operation mode, all the enable signal lines 130 switch to the enable mode to enable all the main power supply units 110a, 110b, 110c, such that the power supply system 100 supplies power to all the first circuit blocks 210 and the second circuit block 220.

Figure 7:
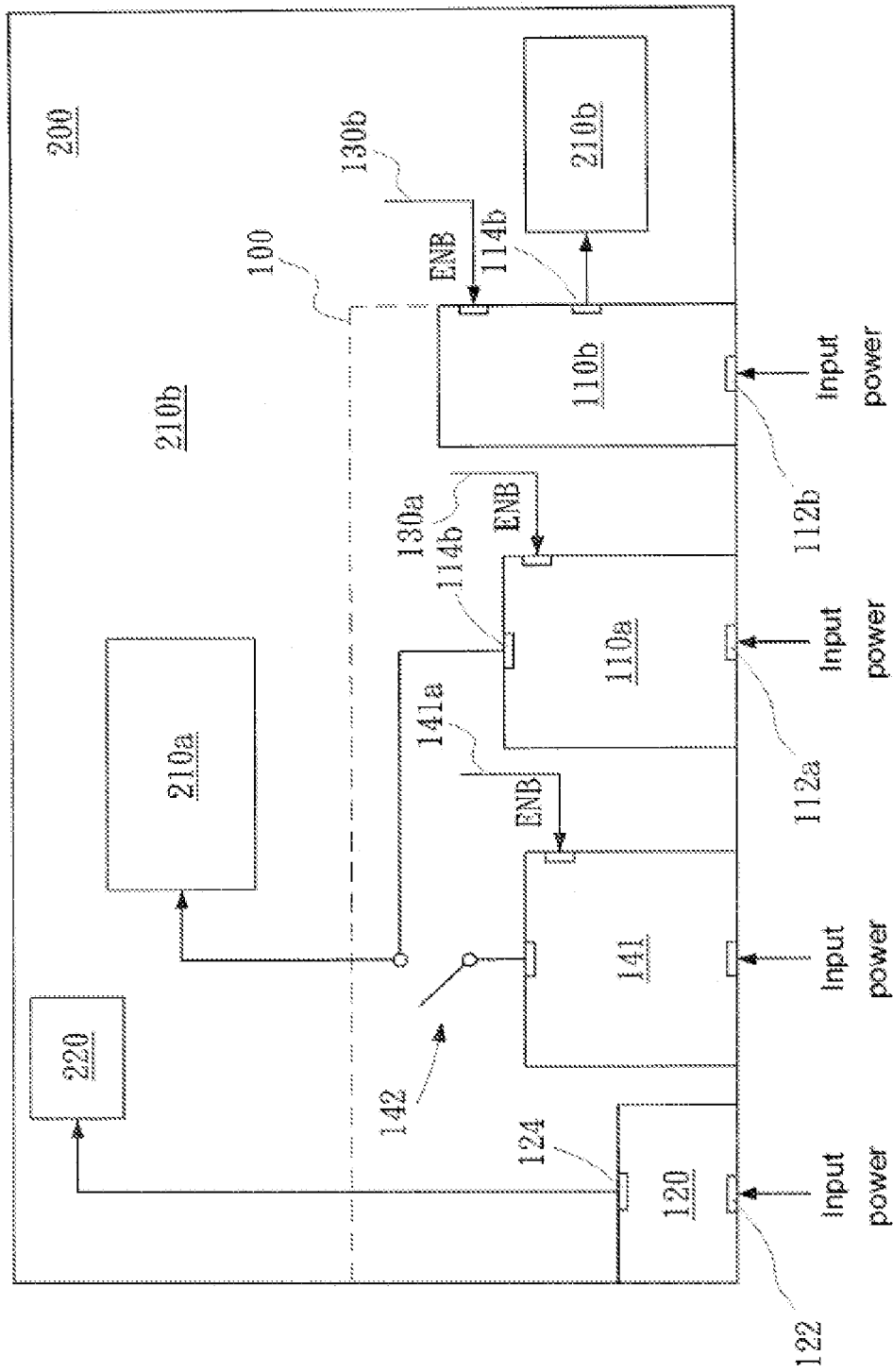
FIG. 7 is a circuit block diagram of the power supply system according to yet another embodiment of the present invention.

Referring to FIG. 7, in the third embodiment of the present invention, the power supply system 100 is adapted to supplying power to the electronic circuit assembly 200. The electronic circuit assembly 200 comprises a plurality of first circuit blocks 210a, 210b, 210c and the second circuit block 220.

The power supply system 100 comprises a plurality of main power supply units 110a, 110b, 110c, the low-current power supply unit 120, a plurality of enable signal lines 130a, 130b, 141a, an auxiliary power supply unit 141, and at least a hub switch 142.

The auxiliary power supply unit 141 is connected to one of the first circuit block 210a by means of the hub switch 142. The hub switch 142 is adapted to switching selectively to a pass or a break between the auxiliary power supply unit 141 and the first circuit block 210a, such that the auxiliary power supply unit 141 and the main power supply unit 110 simultaneously supply power to the corresponding one of the first circuit blocks 210.

If the first circuit block 210a operates at a high speed and therefore has a heavy load, the hub switch 142 will switch to a pass between the auxiliary power supply unit 141 and the first circuit block 210a, whereas the auxiliary power supply unit 141 will receive enable signal ENB from the enable signal line 130 and therefore start to operate, thereby supplying the auxiliary power to the corresponding one of the first circuit blocks 210.

If the first circuit block 210a operates at a low speed and therefore is loaded, the hub switch 142 will switch to a break between the auxiliary power supply unit 141 and the first circuit block 210a, whereas enable signal ENB will interrupt transmission to the auxiliary power supply unit 141 and therefore stop supplying the auxiliary power, and the auxiliary power supply unit 141 will shut down and stop the standby current consumption.

From the perspective of the first circuit block 210a which generates heavy loads, the low-power-consuming main power supply unit 110 supplies power in a general operation state, and it is only when heavy-load operation is to begin that the auxiliary power supply unit 141 capable of supplying a high current starts. Therefore, the auxiliary power supply unit 141 is prevented from consuming unnecessary power in a general operation state.

Figure 8:
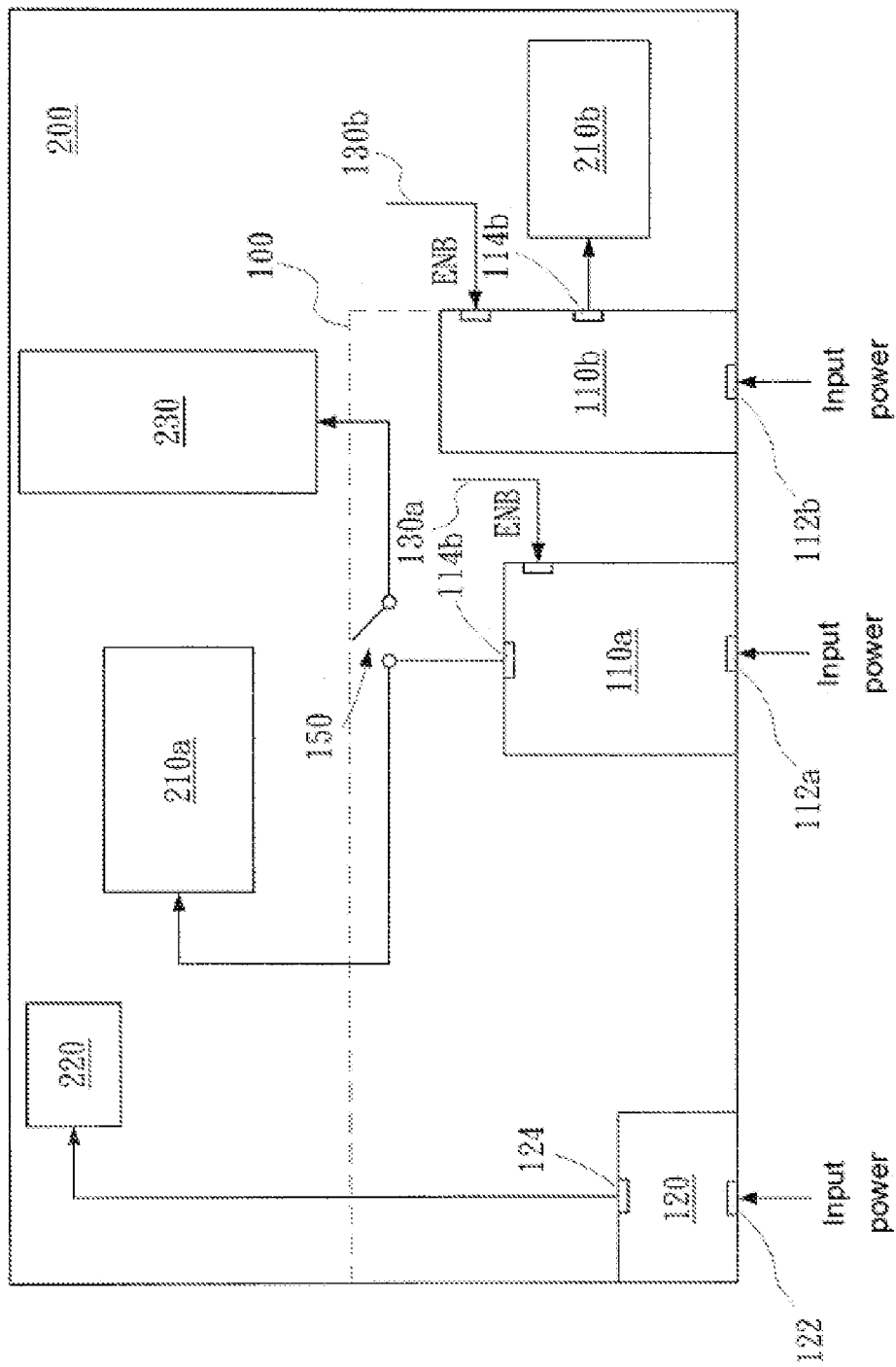
FIG. 8 is a circuit block diagram of the power supply system according to an embodiment of the present invention.

Referring to FIG. 8, in the fourth embodiment of the present invention, the power supply system 100 is adapted to supplying power to the electronic circuit assembly 200. The electronic circuit assembly 200 comprises a plurality of first circuit blocks 210a, 210b, 210c, the second circuit block 220, and third circuit block 230.

The power supply system 100 comprises a plurality of main power supply units 110a, 110b, 110c, a low-current power supply unit 120, and at least a branched switch 150.

The third circuit block 230 is connected to one of the main power supply unit 110b by the branched switch 150. The branched switch 150 selectively switches a pass or a break between the third circuit block 230 and the main power supply unit 110b, such that the main power supply unit 110b supplies power to a corresponding one of the first circuit blocks 210 and the third circuit block 230 simultaneously.

In the situation where the third circuit block 230 is going to operate, the branched switch 150 switches to a pass between the third circuit block 230 and the main power supply unit 110b, so as for the main power supply unit 110b to not only supply power to a corresponding one of the first circuit blocks 210 but also supply power to the third circuit block 230.

In the situation where the third circuit block 230 is ready to shut down, the branched switch 150 switches to a break between the third circuit block 230 and the main power supply unit 110b, such that the third circuit block 230 shuts down completely and does not consume any standby current.

Preferably, the load of the first circuit block 210 is less than the maximum allowable load thereof to ensure that the main power supply unit 110b can supply sufficient current to the first circuit block 210 and the third circuit block 230 simultaneously.

Figure 9:
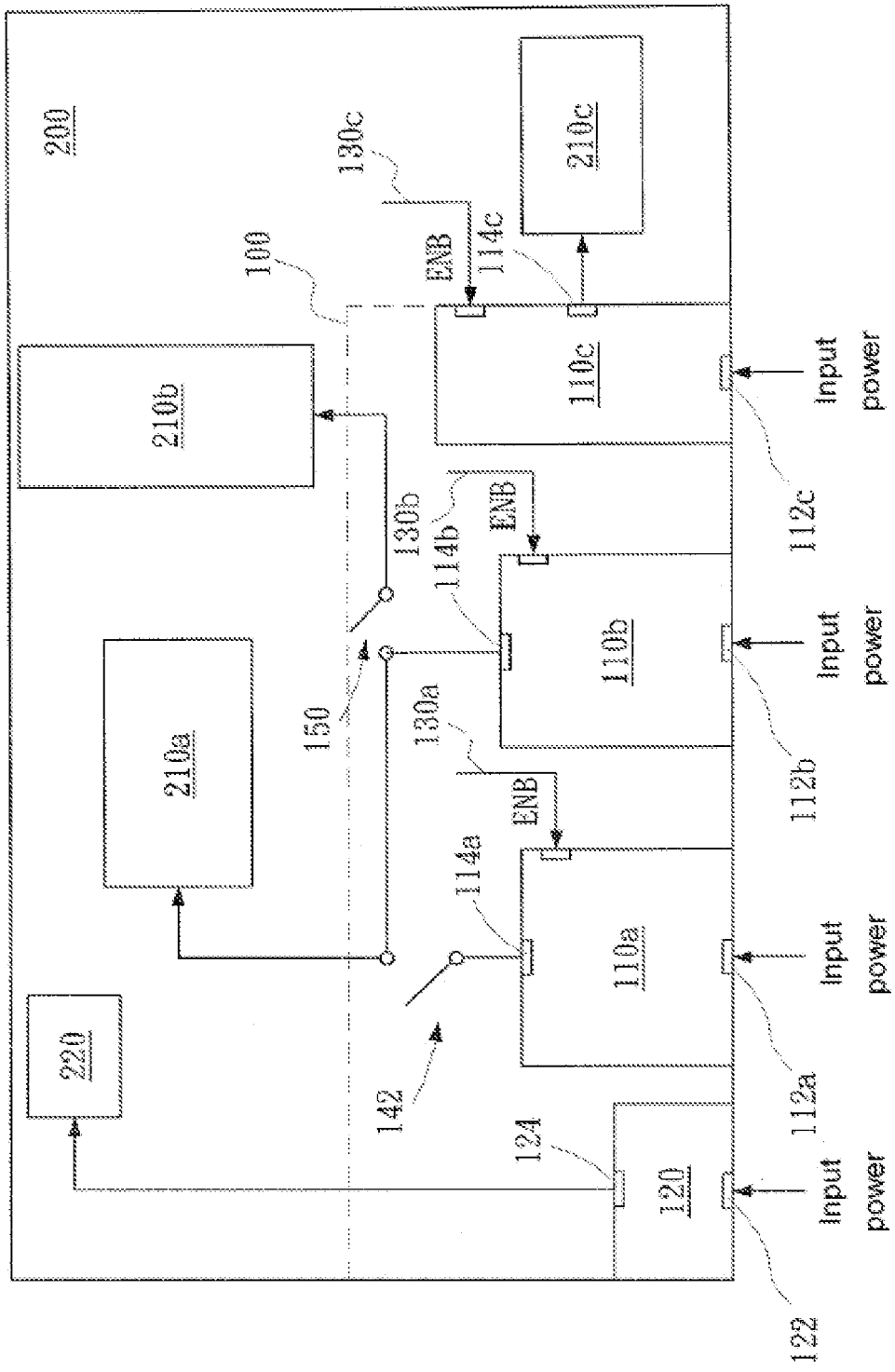
FIG. 9 is another circuit block diagram of the power supply system according to an embodiment of the present invention.

Referring to FIG. 9, the hub switch 142 and the branched switch 150 are not necessarily used in different power supply systems 100; instead, the hub switch 142 and the branched switch 150 can also be used in the same power supply system 100 so as to perform optimal management of unnecessary standby power.

The technical features of the present invention are disclosed above by preferred embodiments. However, persons skilled in the art should understand that the preferred embodiments are illustrative of the present invention only, but should not be interpreted as restrictive of the scope of the present invention. Therefore, slight changes and modifications made to the aforesaid embodiments by any persons skilled in the art should fall within the scope of the present invention, provided that the changes and modifications made do not depart from the spirit embodied in the present invention. Accordingly, the legal protection for the present invention should be defined by the appended claims.

What is claimed is:

1. A low standby consumption power supply system having multi-channels for power supply, for supplying power to an electronic circuit assembly, the electronic circuit assembly comprising a first circuit block and a second circuit block, the power supply system comprising:
a main power supply unit configured to supply power to the first circuit block;
a low-current power supply unit configured to supply power to the second circuit block; and
an enable signal line configured to send an enable signal to the main power supply unit to switch the main power supply unit from a power-off status to a power-on status,
wherein the enable signal line operates in an enable mode and a shutdown mode, the enable mode allowing the enable signal line to send the enable signal to the main power supply unit so as for the main power supply unit and the low-current power supply unit to supply power to the first circuit block and the second circuit block simultaneously, and the shutdown mode allowing the enable signal to interrupt and allowing the main power supply unit to shut down and stop supplying output power to the first circuit block to thereby interrupt standby current consumption thereof,
wherein the main power supply unit and the low-current power supply unit receive input powers from the same power source, and the received input power is converted into different output power, respectively.

2. The power supply system of claim 1, wherein the main power supply unit comprises:
a main power input end configured to receive the input power to thereby cause the main power supply unit to convert the input power into an output power;
a main power output end configured to output the output power to the first circuit block; and
a switch pin configured to receive the enable signal to switch the main power supply unit to the power-on status.

3. The power supply system of claim 2, wherein the enable signal is generated by the low-current power supply unit and sent to the signal pin by the enable signal line.

4. The power supply system of claim 2, wherein the enable signal is generated by the second circuit block and sent to the signal pin by the enable signal line.

5. The power supply system of claim 1, wherein the low-current power supply unit comprises:
an auxiliary power input end configured to receive the input power to thereby cause the low-current power supply unit to convert the input power into an output power; and
an auxiliary power output end configured to output the output power to the second circuit block.

6. The power supply system of claim 1, further comprising:
a plurality of main power supply units; and
a plurality of enable signal lines,
wherein the main power supply units supply power to a plurality of first circuit blocks; and the enable signal lines provide enable signals to the different main power supply units, respectively, so as to cause the main power supply units to shut down separately, stop supplying output power, and interrupt standby current consumption thereof.

7. The power supply system of claim 6, further comprising:
an auxiliary power supply unit; and
a hub switch,
wherein the auxiliary power supply unit is connected to one of the first circuit blocks via the hub switch, and the hub switch switches selectively a pass or a break between the auxiliary power supply unit and the aforesaid first circuit block.

8. The power supply system of claim 6, further comprising a branched switch, wherein a third circuit block of the electronic circuit assembly is connected to one of the main power supply units, and the branched switch switches selectively a pass or a break between the third circuit block and the aforesaid main power supply unit.

* * * * *